US012637594B1

(12) United States Patent　　　(10) Patent No.:　　US 12,637,594 B1

Reznikov　　　(45) Date of Patent:　　May 26, 2026

(54) SYSTEM FOR SEALING TWO MEMBERS, ADHESIVE TAPE, TAPE, METHOD OF SEALING TWO MEMBERS, TAPE INCORPORATING EPOXY TYPE MATERIAL, AND/OR TAPE FOR USE IN CONSTRUCTION

(71) Applicant: Alexander Reznikov, Austin, TX (US)

(72) Inventor: Alexander Reznikov, Austin, TX (US)

( * ) Notice: Subject to any disclaimer, the term of this patent is extended or adjusted under 35 U.S.C. 154(b) by 0 days.

(21) Appl. No.: 18/900,703

(22) Filed: Sep. 28, 2024

Related U.S. Application Data

(60) Provisional application No. 63/541,520, filed on Sep. 29, 2023.

(51) Int. Cl.
　　*C09J 7/38*　　　　(2018.01)

(52) U.S. Cl.
　　CPC ............. *C09J 7/38* (2018.01); *C09J 2301/16* (2020.08); *C09J 2301/204* (2020.08)

(58) Field of Classification Search
　　CPC ..... C09J 7/38; C09J 2301/16; C09J 2301/204
　　See application file for complete search history.

(56) References Cited

U.S. PATENT DOCUMENTS

| | | | | | |
|---|---|---|---|---|---|
| 2,907,682 | A | * | 10/1959 | Eichel | C09J 7/38 |
| | | | | | 524/297 |
| 2,988,461 | A | * | 6/1961 | Eichel | C09J 7/21 |
| | | | | | 264/4.4 |
| 3,074,544 | A | * | 1/1963 | Bollmeier | B29C 65/76 |
| | | | | | 426/115 |
| 3,087,606 | A | * | 4/1963 | Vokaty | H02G 15/003 |
| | | | | | 206/219 |
| 3,266,625 | A | * | 8/1966 | Hardman | B65D 81/3261 |
| | | | | | 206/820 |
| 3,458,389 | A | * | 7/1969 | Meterns | B32B 27/00 |
| | | | | | 428/324 |
| 3,708,379 | A | * | 1/1973 | Flint | C09J 7/10 |
| | | | | | 428/688 |
| 3,837,981 | A | * | 9/1974 | Flint | B32B 27/00 |
| | | | | | 156/330 |
| 4,289,233 | A | * | 9/1981 | Firth | C08G 59/18 |
| | | | | | 206/219 |
| 4,291,799 | A | * | 9/1981 | Bower, Jr. | E21D 20/026 |
| | | | | | 206/568 |
| RE30,843 | E | * | 1/1982 | Flint | C08J 3/241 |
| | | | | | 428/323 |
| 4,396,447 | A | * | 8/1983 | Firth | B29C 53/04 |
| | | | | | 156/289 |
| 4,836,879 | A | * | 6/1989 | Edwards | C09J 5/00 |
| | | | | | 156/330 |

(Continued)

*Primary Examiner* — Patricia L. Nordmeyer

(74) *Attorney, Agent, or Firm* — THE GARCIA-ZAMOR LAW FIRM; Ruy Garcia-Zamor

(57)　　　　　　ABSTRACT

A sealing device and/or a sealing tape which may preferably, but not necessarily, be at least one of: a strengthened tape structure; a construction tape that is easier to use to seal panels together and which requires less work by the user to install; be visually appealing; a sealing tape that provides a better seal between construction materials and/or roofing pieces; be suitable for use by construction companies, utility companies, or any other companies requiring a better sealing tape; and/or be sturdy enough for commercial use; and/or readily manufacturable.

20 Claims, 12 Drawing Sheets

(56) References Cited

U.S. PATENT DOCUMENTS

| | | | | |
|---|---|---|---|---|
| 4,858,604 | A * | 8/1989 | Konishi | A61F 13/0203 |
| | | | | 602/57 |
| 8,328,017 | B2 * | 12/2012 | Perell | B65D 75/305 |
| | | | | 383/3 |
| 8,381,903 | B2 * | 2/2013 | Ilfrey | B65D 81/3266 |
| | | | | 206/568 |
| 9,174,881 | B2 * | 11/2015 | Cimaglio | C04B 28/14 |

* cited by examiner

SYSTEM FOR SEALING TWO MEMBERS, ADHESIVE TAPE, TAPE, METHOD OF SEALING TWO MEMBERS, TAPE INCORPORATING EPOXY TYPE MATERIAL, AND/OR TAPE FOR USE IN CONSTRUCTION

CROSS REFERENCE TO RELATED APPLICATIONS

This application claims priority to and benefit of U.S. Provisional Patent No. 63/541,520, filed Sep. 29, 2023, which is hereby incorporated by reference herein in its entirety as if fully set forth herein.

BACKGROUND

The preferred embodiments of the present invention relate generally to construction materials. More specifically, one embodiment of the preferred embodiment of the present invention relates to an adhesive tape. Another preferred embodiment of the present invention relates to a sealing tape having a central channel to allow stored epoxies to be deposited therein and form a stronger seal.

Typically, tapes used in roofing and other construction projects are simply large rolls of tape for sealing gaps between various parts and pieces used in the construction project. However, these typical tapes may be flimsy and are only ever as strong as the material of the tape itself. Therefore, it is an object of the present invention to overcome these drawbacks.

It may be advantageous to provide a sealing device and/or a sealing tape which may preferably, but not necessarily, include at least one of: an aesthetically pleasing design; a built-in epoxy chamber; a strengthened tape structure; a construction tape that is easier and requires less work by the user; be visually appealing; a low profile; a sealing tape that provides a better seal between construction materials and/or roofing pieces; be suitable for use by construction companies, utility companies, or any other companies requiring a better sealing tape; be sturdy enough for commercial use; be efficient for manufacture; be easily stored in rolls; be useful for use by people with limited strength or of advanced age; store components that when mixed after placement of the tape establishes a substantially watertight/waterproof seal between the two components over which the tape extends; be able to be cut and/or torn into desired lengths; be able to be squeegeed and/or rolled out to deploy the sealing chemical liquid in a central channel; and/or be easy to use.

SUMMARY

Briefly speaking, one embodiment of the present invention is directed to an adhesive device. The adhesive device may comprise a first side having a first top side and a first bottom side and a second side having a second top side and a second bottom side. The second side may be parallel to the first side. The sealing device may also comprise an intermediary portion connecting the first side to the second side. The intermediary portion may have a channel running therethrough. The first and second bottom sides may comprise an adhesive such that the first and second bottom sides can be detachably affixed to a surface. The first and second top sides may each comprise a plurality of chambers extending therealong. Each of the plurality of chambers may be configured to hold a bonding agent. When the plurality of chambers may be squeezed, the bonding agent can be released into the channel of the intermediary portion to cure and may form an airtight seal between the first and second sides.

In a separate aspect, the present invention is related to an adhesive device. The adhesive device may comprise a plurality of check valves located on the intermediary portion. Each of the plurality of check valves may correspond to one of the plurality of chambers. The plurality of check valves may be configured to open under pressure when the plurality of chambers may be squeezed. The plurality of check valves may allow the bonding agent to travel therethrough from the plurality of chambers into the channel.

In a separate aspect, the present invention is related to an adhesive device. The adhesive device may comprise a plurality of chambers extending therealong. Each of the plurality of chambers may be configured to hold a bonding agent. The bonding agent may be a material selected from the group consisting of epoxy, resin, and glue.

In a separate aspect, the present invention is related to an adhesive device. The adhesive device may comprise a plurality of chambers extending therealong. Each of the plurality of chambers may comprise alternating sub chambers. A bonding agent may be stored in the plurality of chambers. The bonding agent may comprise a first chemical compound and a second chemical compound. The first and second chemical compounds being stored in the alternating sub chambers. When each of the plurality of chambers may be squeezed, the first chemical compound contained in one of the alternating sub chambers may be forced into and mixed with the second chemical compound contained in another of the alternating sub chambers.

In a separate aspect, the present invention is related to an adhesive device. The adhesive device may comprise a plurality of chambers extending therealong. Each of the plurality of chambers may comprise alternating sub chambers. A bonding agent may be stored in the plurality of chambers. The alternating sub chambers may be connected in series such that when the plurality of chambers may be squeezed, the bonding agent may be forced through all of the alternating sub chambers before being deposited into the channel of the intermediary portion of the adhesive device.

In a separate aspect, the present invention is related to an adhesive device. The adhesive device may comprise a first side having a first top side and a first bottom side and a second side having a second top side and a second bottom side. The adhesive device may have perforated portions at predetermined points. The adhesive device may be configured to be shortened by cutting the adhesive device at the perforated portions.

In a separate aspect, the present invention is related to an adhesive device. The adhesive device may comprise a plurality of check valves located on the intermediary portion. Each of the plurality of check valves may correspond to one of the plurality of chambers. The plurality of check valves may be configured to open under pressure when the plurality of chambers may be squeezed. The plurality of check valves may form a first row and a second row extending the length of the adhesive device. The first row of check valves may correspond to the plurality of chambers located on the first side and the second row of check valves may correspond to the plurality of chambers located on the second side.

In a separate aspect, the present invention is related to an adhesive device. The adhesive device may comprise a plurality of chambers extending therealong. Each of the plurality of chambers may comprise alternating sub chambers. A bonding agent may be stored in the plurality of chambers. The bonding agent may comprise a first chemical compound and a second chemical compound. The first and second chemical compounds may be configured to remain liquids when stored separately in the plurality of sub chambers. When the first and second chemical compounds are mixed, a resulting chemical compound may be formed from the first and second chemical compounds being mixed. The resulting chemical compound may be configured to harden.

In a separate aspect, an alternative preferred embodiment of the present invention is directed to a sealing tape. The sealing tape may comprise a first side having a first top side and a first bottom side and a second side having a second top side and a second bottom side. The second side may be parallel to the first side. The sealing tape may also comprise an intermediary portion connecting the first side to the second side. The intermediary portion may have a channel running therethrough. The first and second bottom sides may comprise an adhesive such that the first and second bottom sides can be detachably affixed to a surface. A first plurality of chambers may extend lengthwise along the sealing tape. Each of the first plurality of chambers may be configured to hold a bonding liquid. When the first plurality of chambers may be squeezed, the bonding liquid may be released into the channel of the intermediary portion to cure and may form an airtight seal between the first and second sides.

In a separate aspect, the present invention is related to a sealing tape. The sealing tape may comprise a second plurality of chambers parallel to the first plurality of chambers. Each of the second plurality of chambers may be configured to hold the bonding liquid. When the second plurality of chambers may be squeezed, the bonding liquid may be released into the channel of the intermediary portion to mix with the bonding liquid of the first plurality of chambers to cure and may form the airtight seal between the first and second sides.

In a separate aspect, the present invention is related to a sealing tape. The sealing tape may further comprise a plurality of check valves located on the intermediary portion. Each of the plurality of check valves may corresponding to the first plurality of chambers. The plurality of check valves may be configured to open under pressure when the first plurality of chambers may be squeezed. The plurality of check valves may allow the bonding liquid to travel therethrough from the first plurality of chambers into the channel.

In a separate aspect, the present invention is related to a sealing tape. A first plurality of chambers may extend lengthwise along the sealing tape. Each of the first plurality of chambers may comprise alternating sub chambers.

In a separate aspect, the present invention is related to a sealing tape. A first plurality of chambers may extend lengthwise along the sealing tape. A bonding liquid may be configured to be stored in the first plurality of chambers. Each of the first plurality of chambers may comprise alternating sub chambers. The bonding liquid may comprise a first chemical compound and a second chemical compound. The first and second chemical compounds may be stored in the alternating sub chambers. When each of the first plurality of chambers may be squeezed, the first chemical compound contained in one of the alternating sub chambers may be forced into and mixed with the second chemical compound contained in another of the alternating sub chambers.

In a separate aspect, the present invention is related to a sealing tape. A first plurality of chambers may extend lengthwise along the sealing tape. The first plurality of chambers may be positioned along the intermediary portion of the sealing tape.

In a separate aspect, an alternative preferred embodiment of the present invention is directed to a tape. The tape may comprise an adhesive underside configured to detachably affix to a first surface. The tape may also comprise a central channel spanning a length of the tape. The tape may further comprise a plurality of chambers located along the length of the tape. The plurality of chambers may be configured to contain a bonding chemical therein. When the plurality of chambers may be squeezed, the bonding chemical may be released into the central channel to cure and form an airtight seal.

In a separate aspect, the present invention is related to a tape. The tape may comprise an adhesive underside configured to detachably affix to a first surface. The adhesive underside of the tape may also be configured to detachably affix to a second surface spaced from the first surface. The central channel of the tape may span a gap between the first and second surfaces.

In a separate aspect, the present invention is related to a tape. The tape may further comprise a plurality of chambers located along the length of the tape. Each of the plurality of chambers may comprise alternating sub chambers. The bonding liquid may comprise a first chemical compound and a second chemical compound. The first and second chemical compounds may be stored in the alternating sub chambers. When each of the first plurality of chambers may be squeezed, the first chemical compound contained in one of the alternating sub chambers may be forced into and mixed with the second chemical compound contained in another of the alternating sub chambers.

BRIEF DESCRIPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. It is understood, however, that the invention is not limited to the precise arrangements and instrumentalities shown. In the drawings.

Those of ordinary skill in the art will appreciate from this disclosure that the tape 10 is preferably made from a suitably strong, durable, and/or flexible material, such as a polymer. The adhesive strips are preferably formed by a suitable tacky layer. However, those of ordinary skill in the art will appreciate that any suitable materials may be used to form the tape 10 of the present invention without departing from the scope of the present invention.

Figures 1, 2:
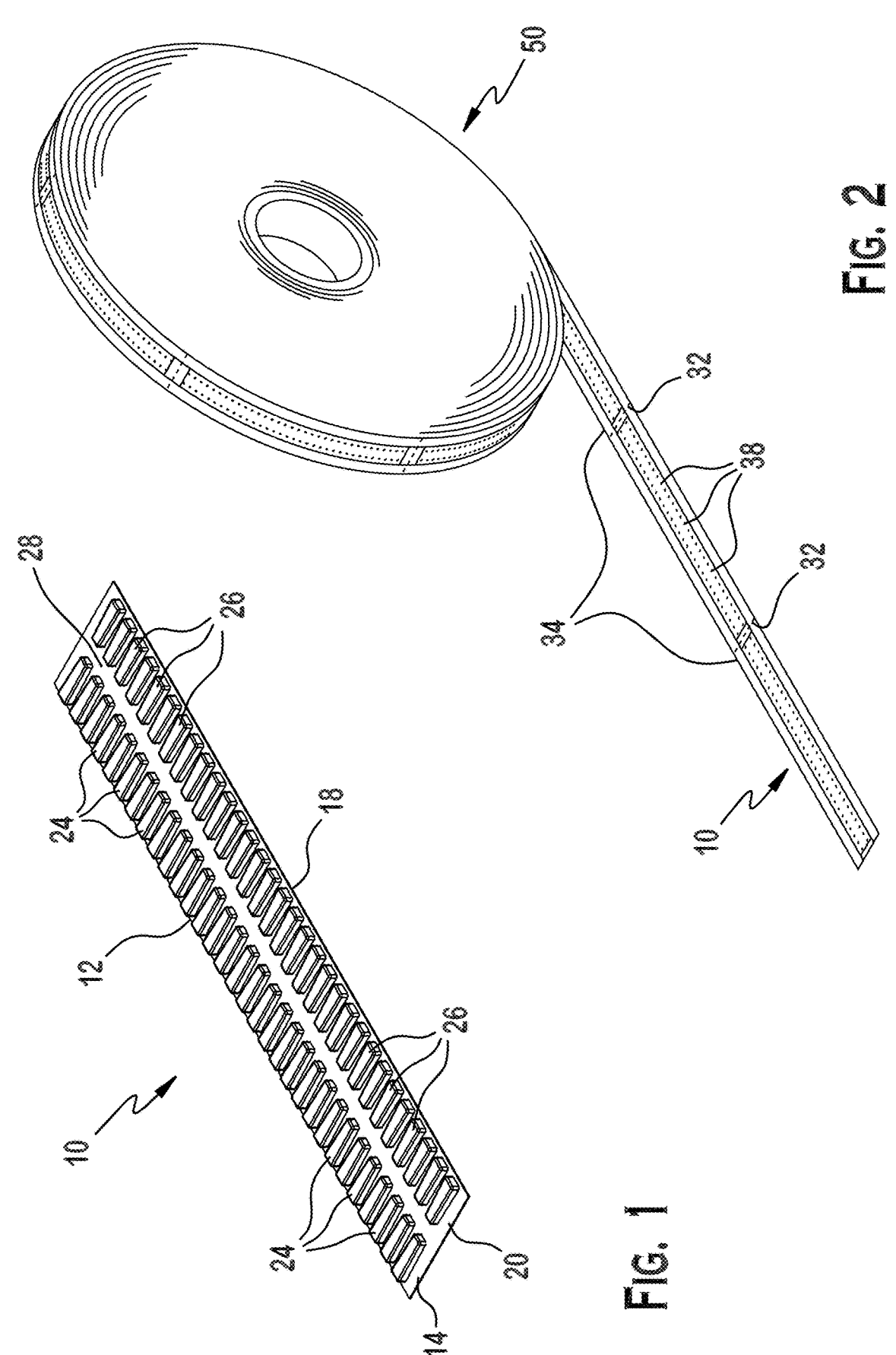
FIG. 1 is a top, front perspective view of a sealing tape 10 in the preferred embodiment. Here, it may be seen that the sealing tape 10 may comprise first and second sides 12, 18. The first side 12 may comprise a first topside 14. The second side 18 may comprise a second topside 20. The first side 12 and the second side 18 may be connected by an intermediary portion 28. Arranged along the first topside 14, there may be a first plurality of chambers 24 extending therealong. Similarly, arranged along the second topside 20, there may be a second plurality of chambers 26 extending therealong.

FIG. 2 is a top, front perspective view of a roll 50 of the sealing tape 10 in the preferred embodiment. Here, it may be seen that as the roll 50 of sealing tape 10 may be unrolled, the sealing tap 10 may comprise multiple sections. The multiple selections of the sealing tape 10 may be delineated at predetermined points 34. At each of the predetermined points 34, there may be perforated portions 32. These perforated portions 32 may allow a user of the sealing tape 10 to cut or tear away individual sections of the multiple sections at desired intervals.

Figure 3:
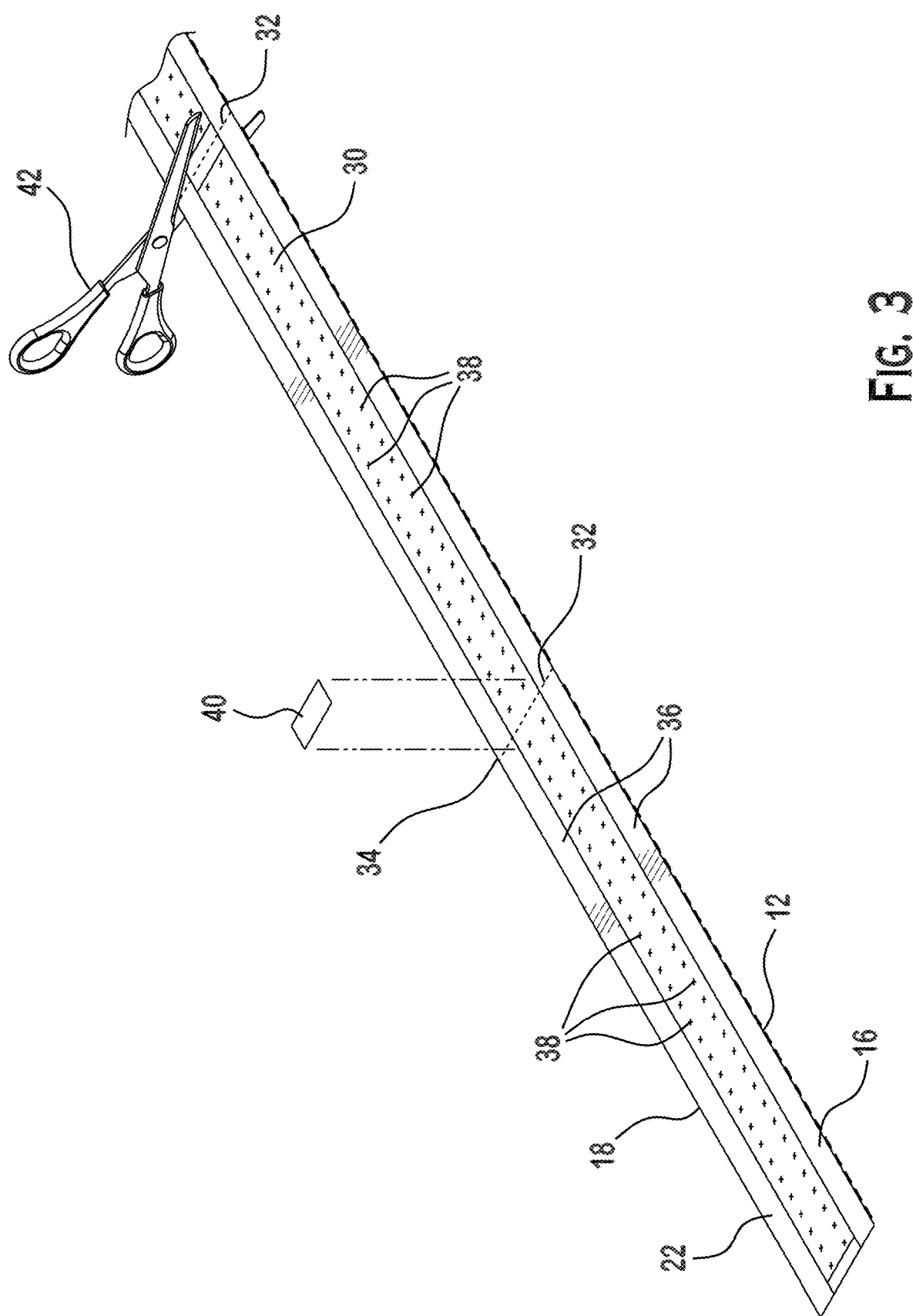

FIG. 3 is a bottom, rear perspective view of sealing tape 10. Here, the first bottom side 16 of the first side 12 and second bottom side 22 of the second side 18 may be seen. The first and second bottom sides 16, 22 may comprise an adhesive underside 36. A channel 30 may also be seen defined between the intermediary portion 28 and the first and second bottom sides 16, 22. The intermediary portion 28 may also comprise a plurality of check valves 38 which may lead to the channel 30. The channel 30 may be blocked by channel stops 40 placed anywhere therein. In this specific embodiment shown, the channel stop 40 may be placed at one of the predetermined points 34 where the perforated portion 32 may lay. Also, it may be seen that a user can use scissors 42 to cut through the sealing tape 10 at the perforated portion 32. The channel stops 40 may also be cut or torn along the perforated portion 32.

Figures 4, 5:
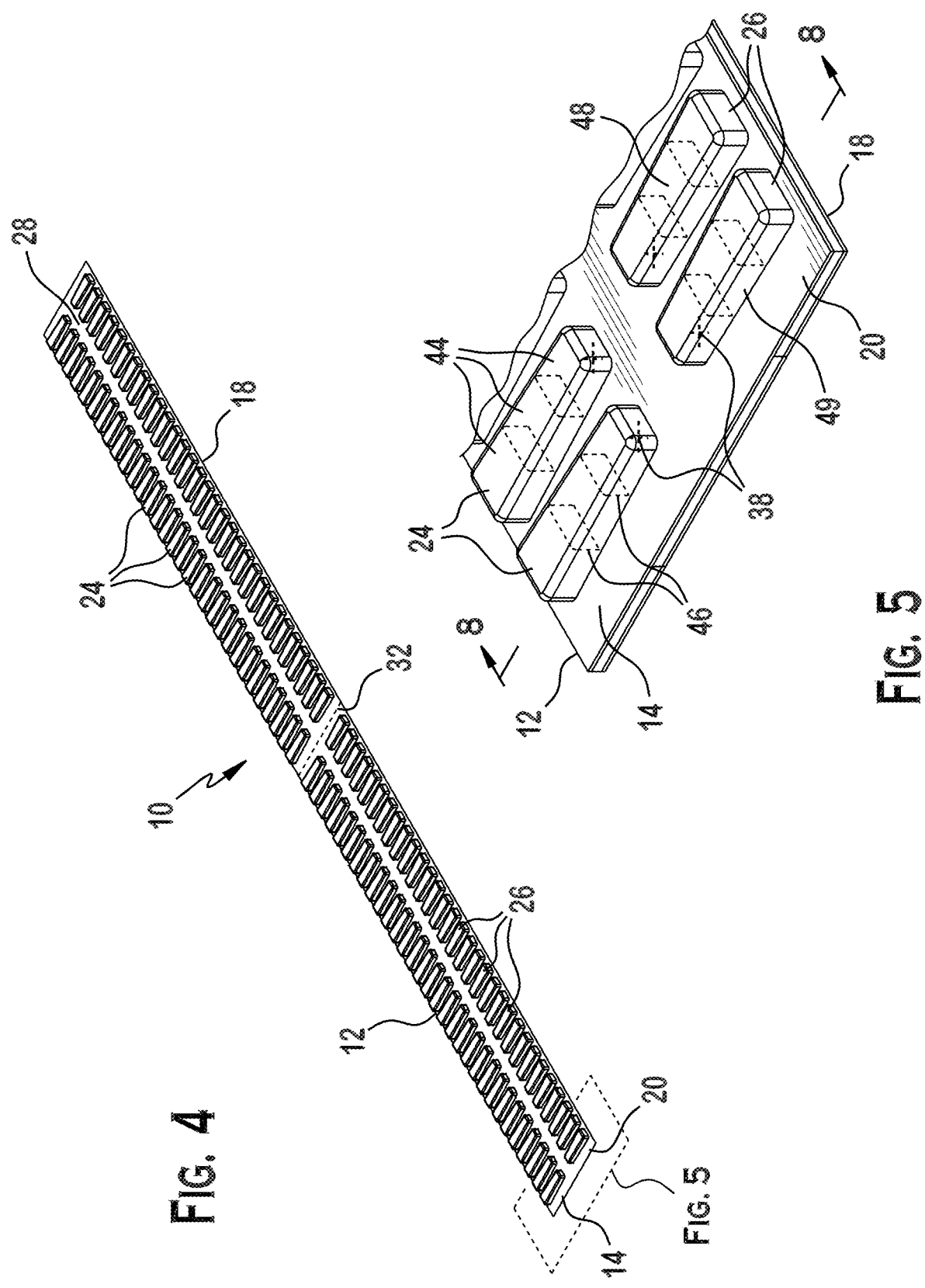

FIG. 4 is a top, front perspective view of the adhesive device 10 in the preferred embodiment. Here, the adhesive device 10 may be seen with two of the multiple sections connected together end-to-end. This figure may highlight how there may be a small break in the otherwise regular spacing between each of the chambers of the first and second pluralities of chambers 24, 26.

FIG. 5 is a partially cut-away, enlarged perspective view of the sealing tape 10 as seen in FIG. 4. Here, the first and second pluralities of chambers 24, 26 may be seen in greater detail. Each of the first and second pluralities of chambers 24, 26 may comprise a chamber top 48 and chamber sidewalls 49 there around. Each of the first and second pluralities of chambers 24, 26 may be enclosed on the bottom by the first and second topsides 14, 20, respectively. Each of the first and second prize chambers 24, 26 may also comprise a plurality of sub chambers 44 contained therein. These sub chambers 44 may be delineated by sub chamber dividers 46 also located within the chambers 24, 26. The plurality of check valves 38 may also be seen located at a bottom portion of one of the plurality of sub chambers 44 of each of the first and second plurality of chambers 24, 26.

Figures 6, 7:
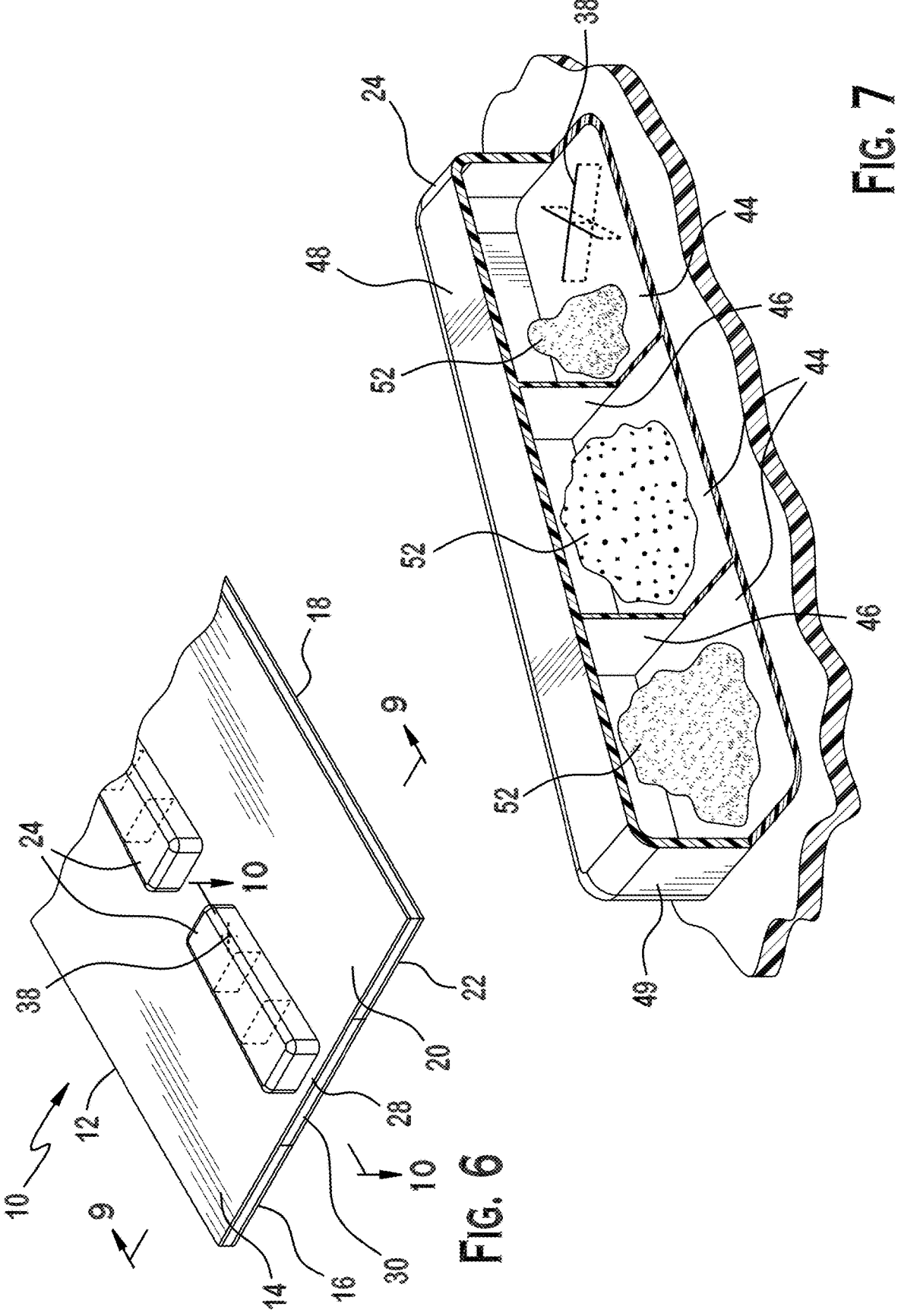

FIG. 6 is a partially cut-away, enlarged perspective view of an alternative preferred embodiment of the sealing tape 10. Here, only the first plurality of chambers 24 may be seen. The second plurality of chambers 26 of previous preferred embodiments may be omitted. In this alternative preferred embodiment of the sealing tape 10, the first plurality of chambers 24 may be located directly along the intermediary portion 28 instead of being located along the first topside 14 of the first side 12.

FIG. 7 is a partially cut-away, enlarged perspective view of one of the plurality of first and second chambers 24, 26 of the sealing tape in the preferred embodiment. Each of the sub chambers 44 may be configured to contain a bonding chemical 52. The bonding chemical 52 may be comprised of separate first and second chemical compounds A, B. The first and second chemical compounds A, B may be stored in alternating, adjacent sub chambers 44. The check valve 38 may also be seen located at the bottom of the innermost sub chamber of the sub chambers 44 located above the channel 30.

Figures 8, 9:
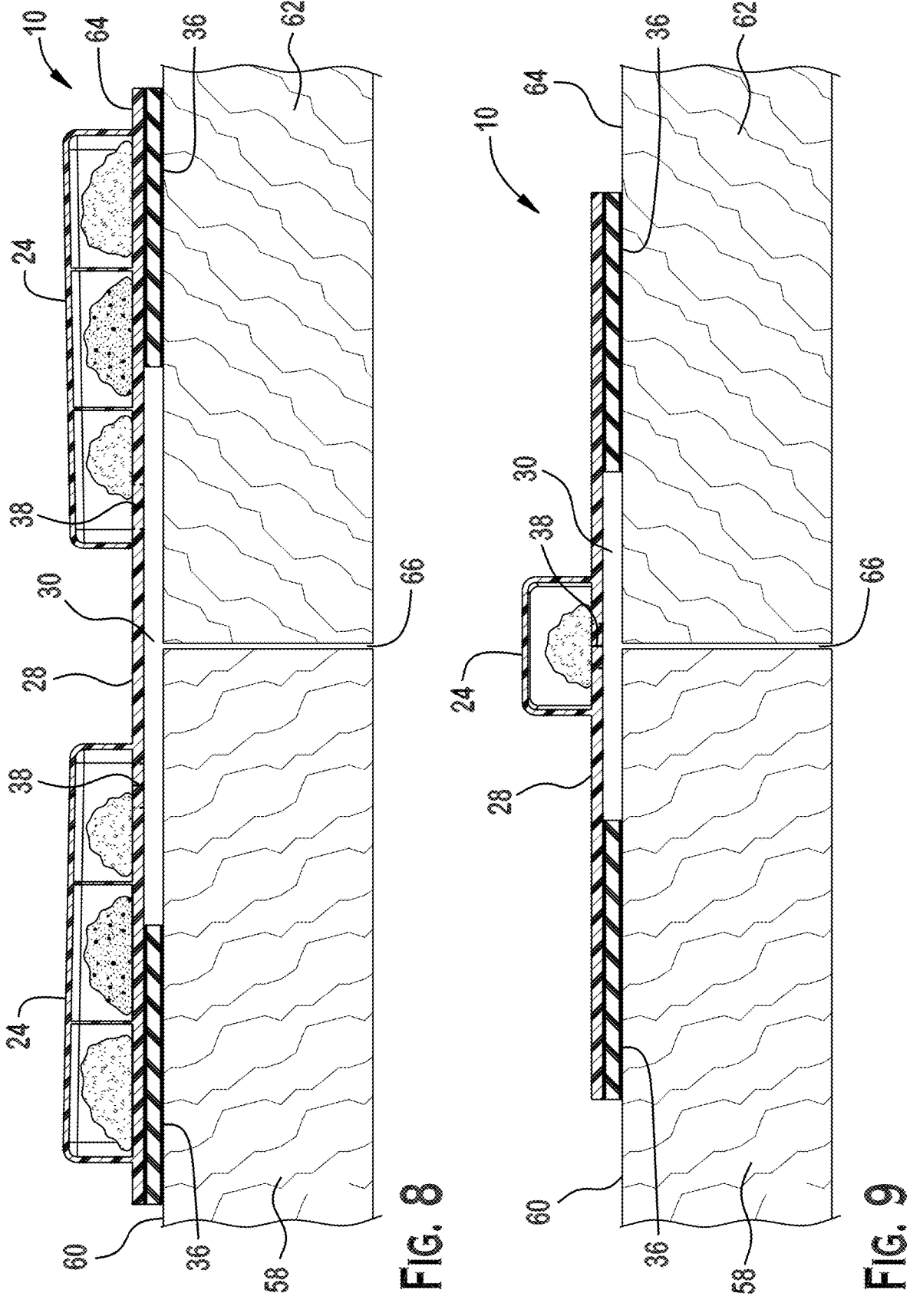

FIG. 8 is a side, cross-sectional view of the sealing tape 10 connected in the preferred embodiment as taken along the line 8-8 of FIG. 5. The sealing tape 10 may be detachably affixed to the first and second surfaces 60, 64 of first and second construction materials 58, 62 via the adhesive undersides 36. The first and second construction materials 58, 62 may be separated by a gap 66. The gap 66 may lie below the channel 30 formed under the sealing tape 10. The check valves 38 may also be seen separating the internal space of the first and second chambers 24, 26 from the channel 30.

FIG. 9 is a side, cross-sectional view of the sealing tape 10 connected in the alternative preferred embodiment as taken along the line 9-9 of FIG. 6. Here, the single first plurality of chambers 24 may be seen directly above the gap 66 formed between the first and second construction materials 58, 62. In this embodiment, the check valve 38 may also be located directly above the gap 66.

Figure 10:
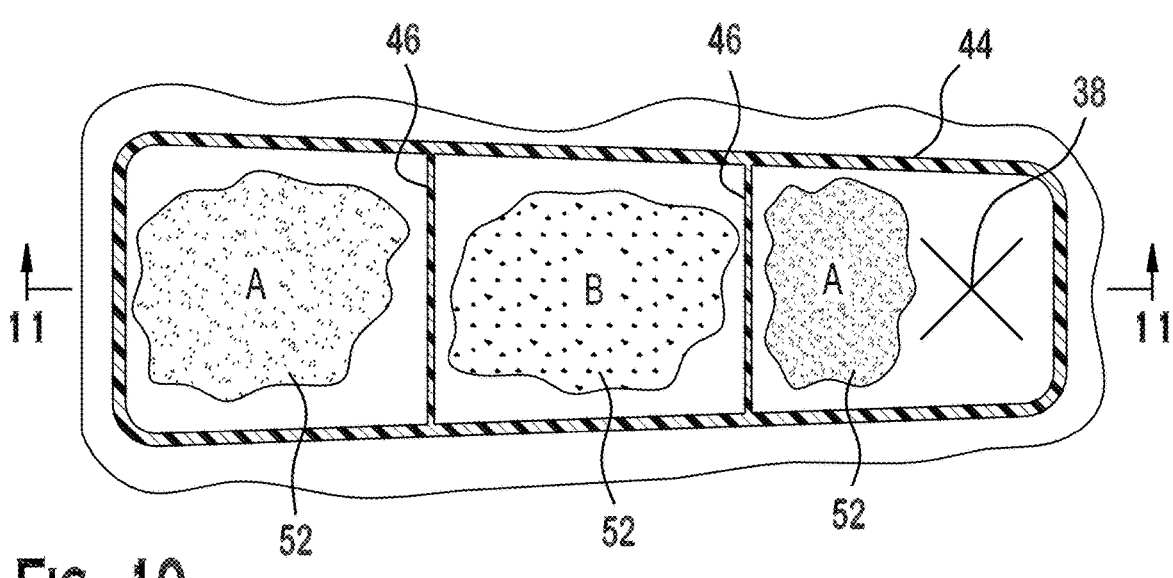

FIG. 10 is a top, cross-sectional view of one of the chambers of the first and second pluralities of chambers 24, 26 of the sealing tape 10 in the preferred embodiment. This figure may highlight how different amounts of the bonding liquid 52 may be contained within each of the sub chambers 44 of the first and second chambers 24, 26. It may also be seen how the first chemical compound A located in one of the sub chambers 44 may be kept separate from the second chemical compound B located in an adjacent one of the sub chambers 44 by the sub chamber dividers 46.

Figure 11:
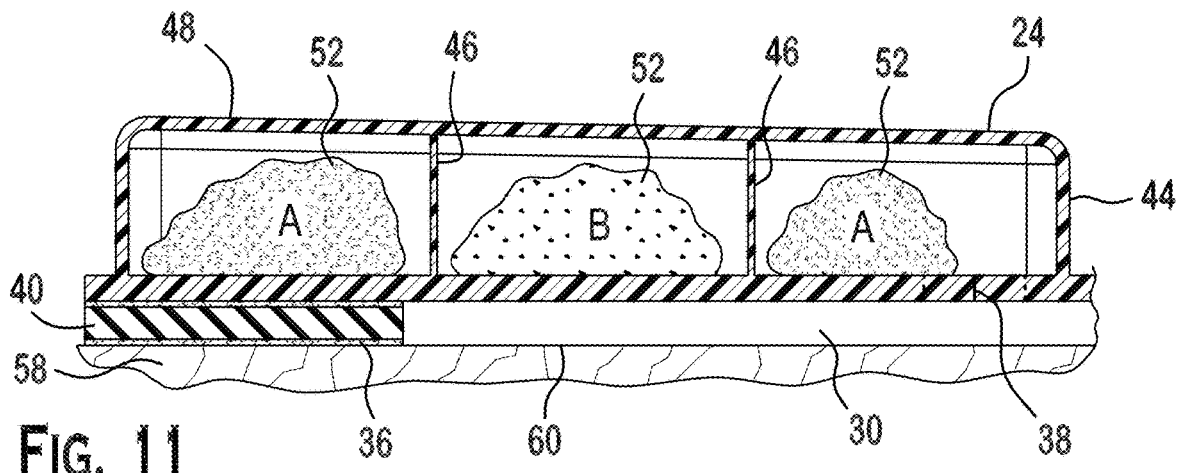

FIG. 11 is a side, cross-sectional view of one of the chambers of the first and second pluralities of chambers 24, 26 of the sealing tape 10 in the preferred embodiment as taken along the line 11-11 of FIG. 10. This figure may further highlight how the first and second chemical compounds A, B may be separated within the sub chambers 44 by the sub chamber dividers 46 located within the first and second chambers 24, 26. The check valve 38 may also be seen separating the innermost sub chamber 44 from the channel 30 located therebelow. This figure may also highlight how there may be three sub chambers 44. However, one of ordinary skill in the art will appreciate from this disclosure that there may be one, two, three, four, five, or more sub chambers 44 per each chamber 24, 26 without departing from the scope of the present invention.

Figure 12:
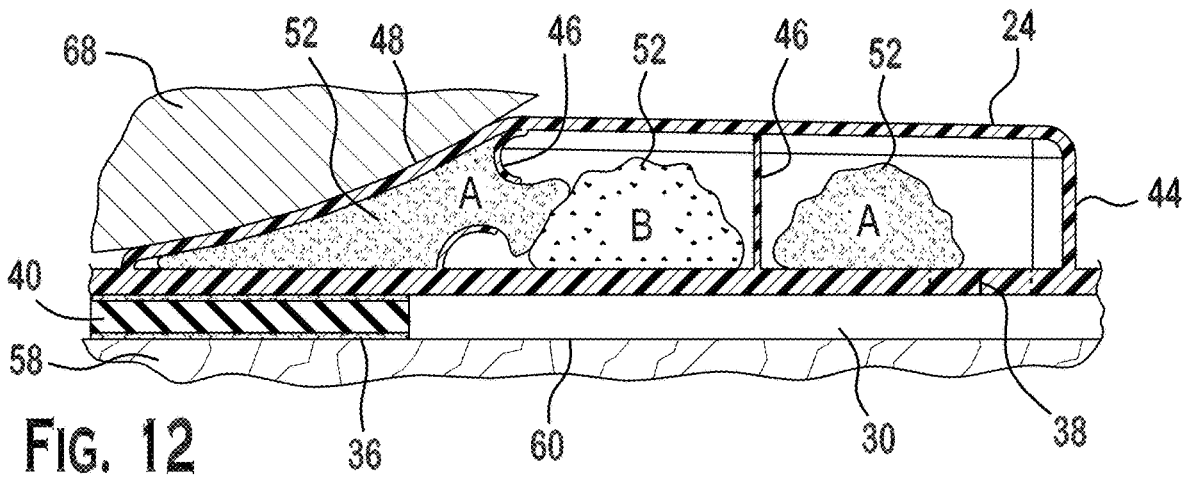

FIG. 12 is a side, cross-sectional view of the sealing tape 10 in the preferred embodiment. Here, a roller 68 may be employed to crush, squeeze, and/or otherwise depress the sub chambers 44 of the plurality of first and second chambers 24, 26. As each of the sub chambers 44 may be crushed, the expansion and pressure of the squeezed first chemical compound A may cause one of the sub chamber dividers 46 to rupture and/or break so that the first chemical compound A may mix with the second chemical compound B.

Figure 13:
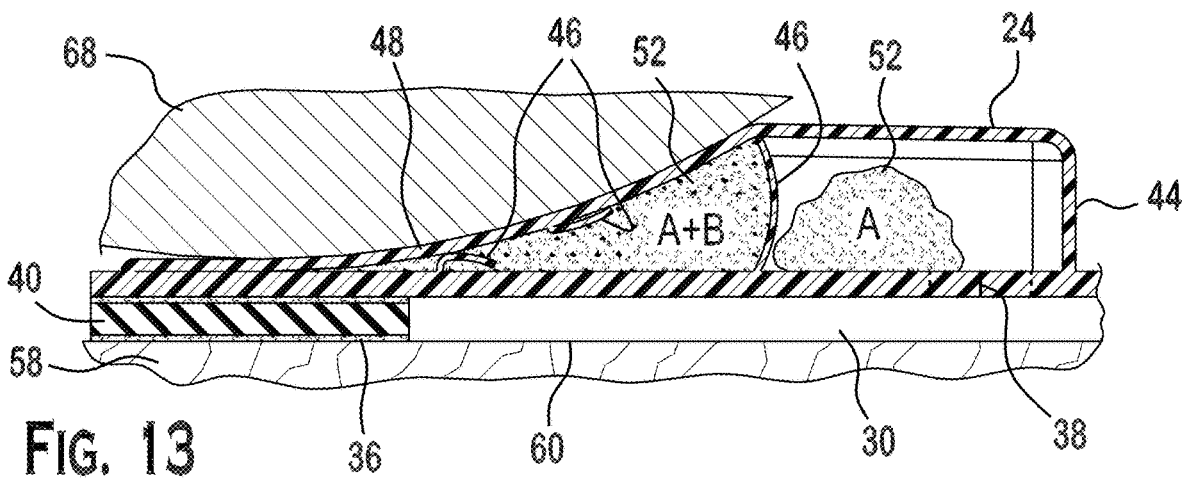

FIG. 13 is a side, cross-sectional view of sealing tape 10 in the preferred embodiment. Here, the first chemical compound A and the second chemical compound B may be fully mixed with one another to form an epoxy or other bonding chemical 52. At this stage, the sub chamber 44 that previously contained chemical compound A may be at least partially flattened.

Figure 14:
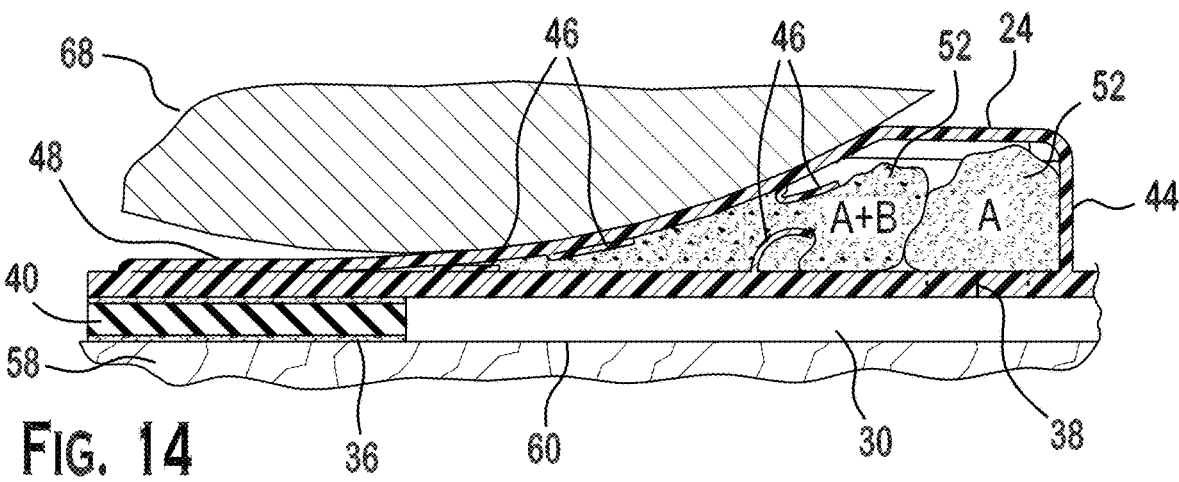

FIG. 14 is a side, cross-sectional view of the sealing tape 10 in the preferred embodiment. Here, another of the sub chamber dividers 46 may be ruptured so that the mixture of first and second chemical compounds A, B may be forced into and mixed with another chemical compound A contained in the final of the sub chambers 44 containing one of the plurality of check valves 44. At this stage, the sub chamber 44 that previously contained chemical compound B may be at least partially flattened.

Figure 15:
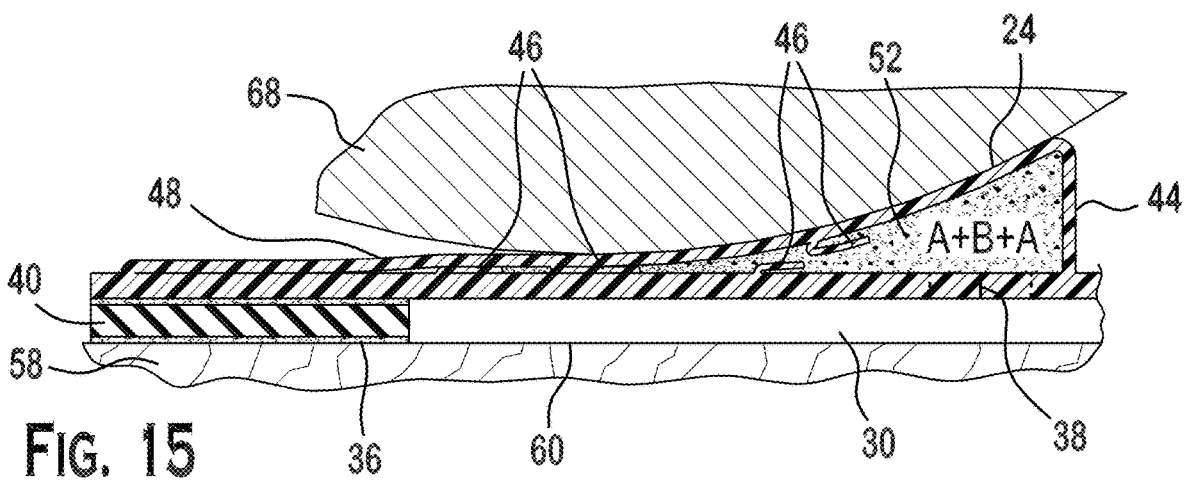

FIG. 15 is a side, cross-sectional view of the sealing tape 10 in the preferred embodiment. Here, it can be seen that all of the first and second chemical compounds A, B may be mixed together to form the final bonding chemical 52 to be released into the channel 30 of the tape 10.

Figure 16:
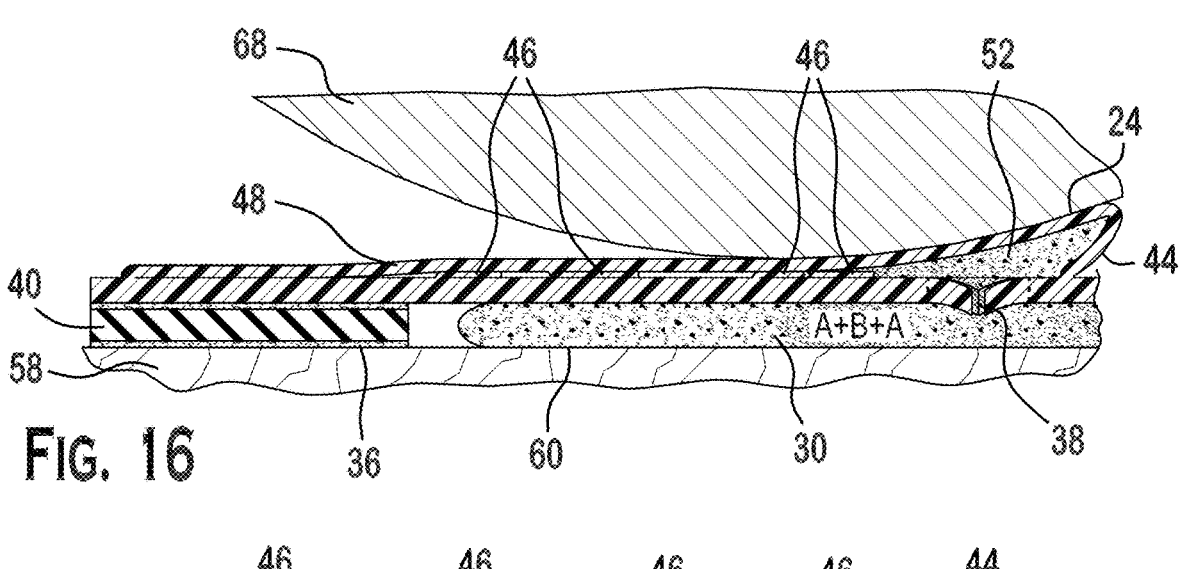

FIG. 16 is a side, cross-sectional view of the sealing tape 10 in the preferred embodiment. Here, it may be seen that as the final sub chamber 44 containing the fully mixed bonding chemical 52 may be crushed and/or rolled-out, the pressure build-up of the bonding liquid 52 may force the check valve 38 to open. With the check valve 38 opened, the bonding liquid may be forced down through the intermediary portion 28 of the tape 10 into the channel 30. From here, the bonding chemical 52 may spread out within the channel 30—mixing with the bonding liquid 52 released by other chambers of the first and second pluralities of chambers 24, 26 and filling the gap 66 between first and second construction materials 58, 62.

Figure 17:
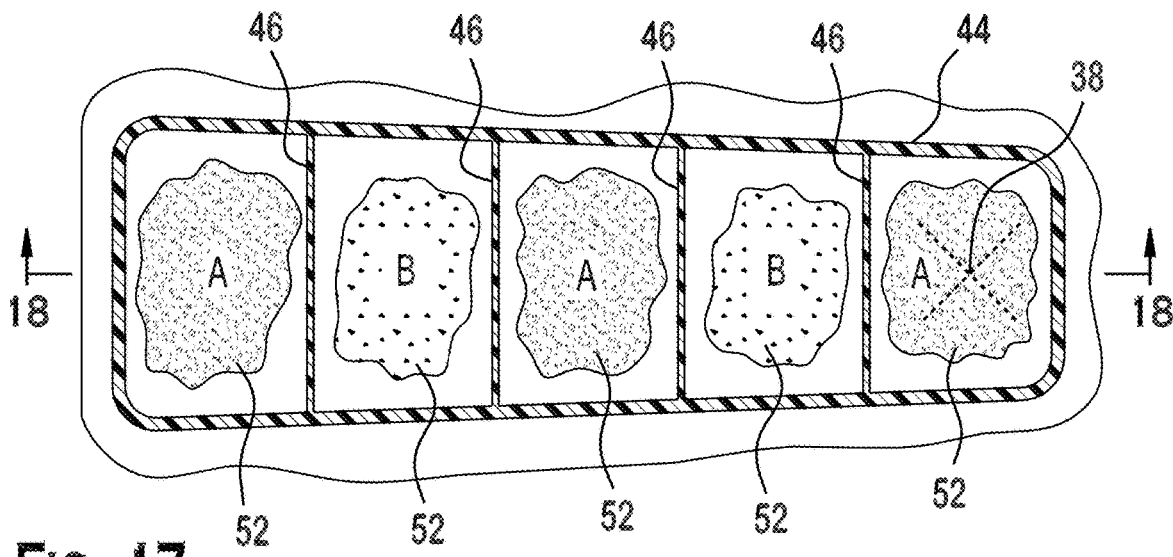

FIG. 17 is a top, cross-sectional view of one of the chambers of the first and second pluralities of chambers 24, 26 of the sealing tape 10 in an alternative preferred embodiment. In this exemplary embodiment, the total number of sub chambers 44 may be five. However, one of ordinary skill in the art will appreciate from this disclosure that first and second pluralities of chambers containing differing numbers of sub chambers function similarly without departing from the scope of the present invention.

Figure 18:
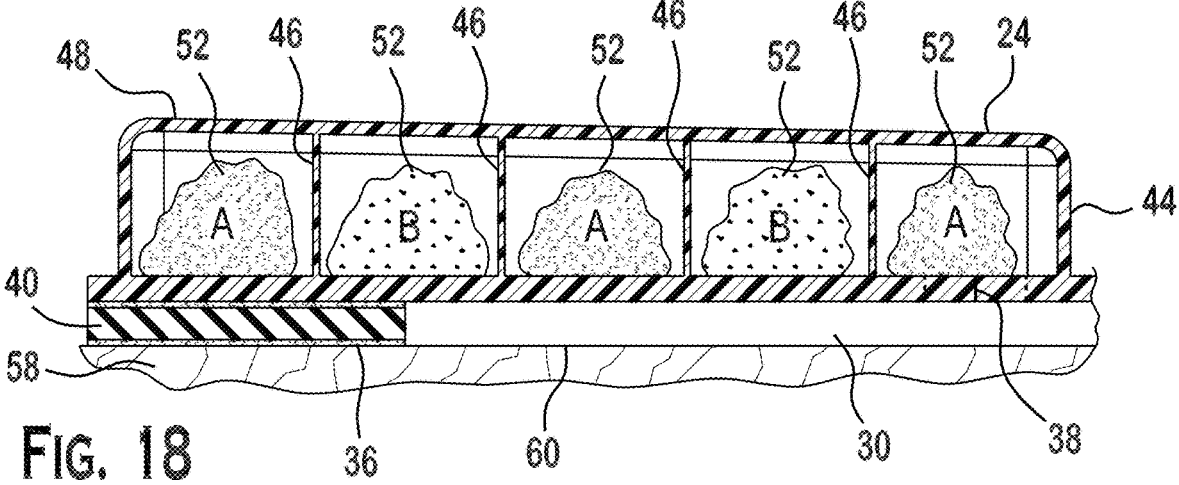

FIG. 18 is a side, cross-sectional view of one of the chambers of the first and second pluralities of chambers 24, 26 of the sealing tape 10 in an alternative preferred embodiment as taken along the line 18-18 of FIG. 17. This figure may illustrate how having more sub chambers 44 may necessitate that the tape 10 to be wider or that each chamber of the first and second pluralities of chambers 24, 26 extend further toward the center of the intermediary portion 28.

Figure 19:
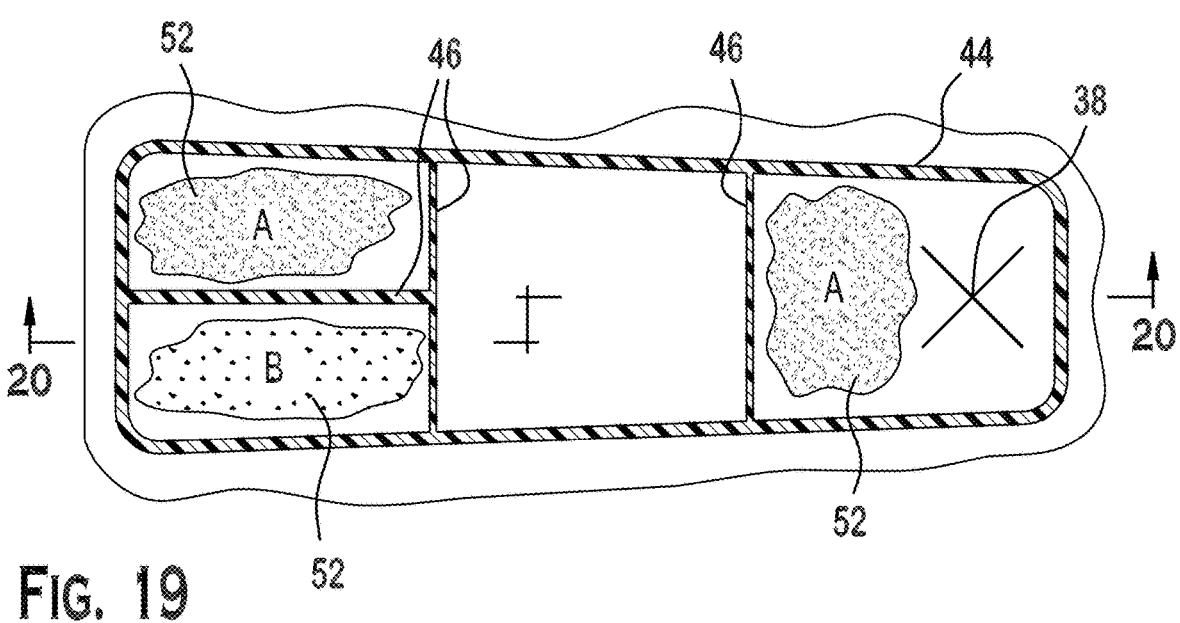

FIG. 19 is a top, cross-sectional view of one of the chambers of the first and second pluralities of chambers 24, 26 of the sealing tape 10 in an alternative preferred embodiment. In this exemplary embodiment, the sub chambers 44 of each chamber of the first and second pluralities of chambers 24, 26 may be connected in parallel in addition to being connected this series. This figure also illustrates how certain sub chambers may be completely empty as desired.

Figure 20:
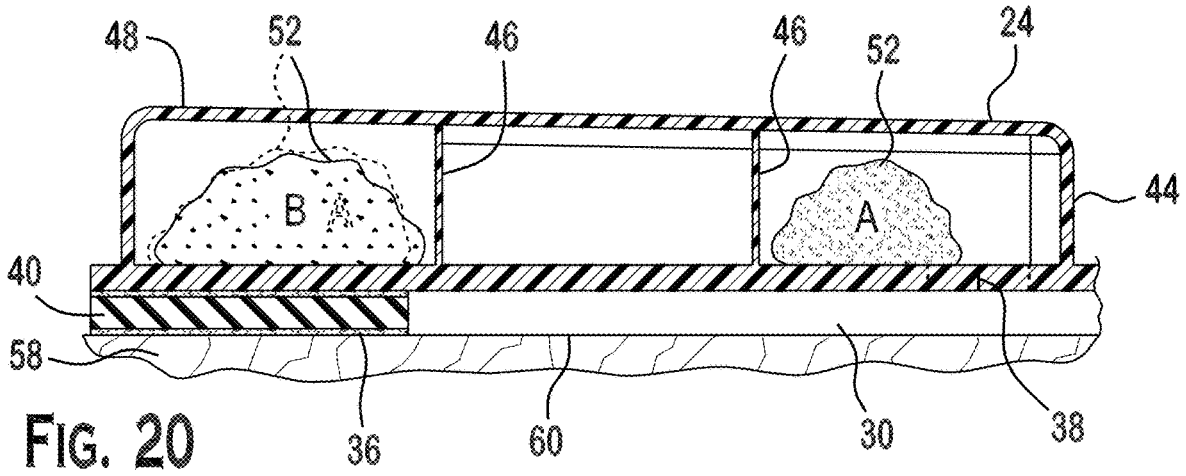

FIG. 20 is a side, cross-sectional view of one of the chambers of the first and second pluralities of chambers 24, 26 of the sealing tape 10 in an alternative preferred embodiment as taken along the line 20-20 of FIG. 19. From this perspective, the first chemical compound A may be seen with the second chemical compound B shown in broken lines therebehind. This figure may also illustrate how the middle of the sub chambers 44 may be empty of all chemical compounds 52. One of ordinary skill in the art will appreciate from this disclosure that any of the sub chambers may be empty without departing from the scope of the present invention.

Figure 21:
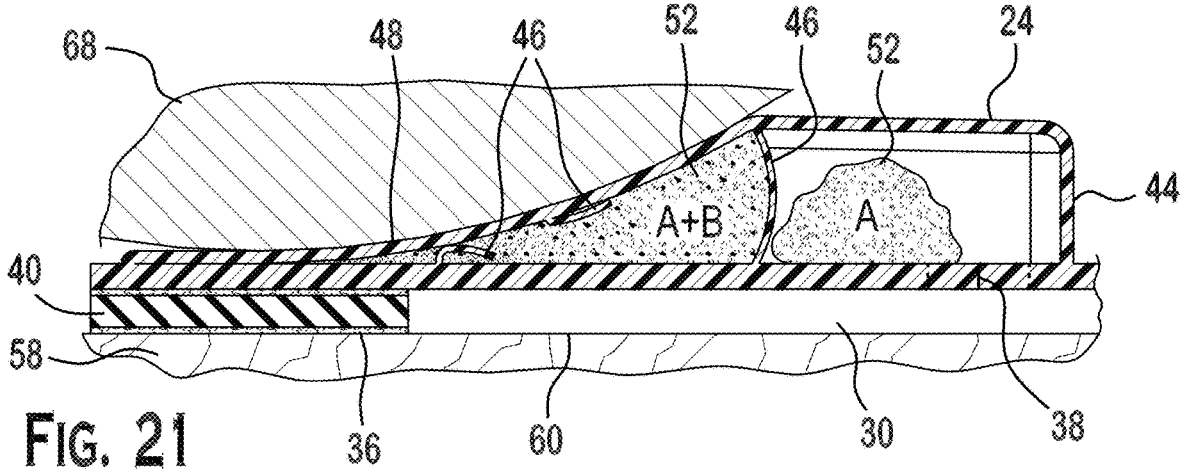

FIG. 21 is a side, cross-sectional view of the sealing tape 10 in an alternative preferred embodiment. Here, the first chemical compound A and the second chemical compound B may be fully mixed with one another in the middle of the sub chambers 44 to form an epoxy or other bonding chemical 52. In this embodiment, the first and second chemical compounds A, B may both be simultaneously forced into the middle of the sub chambers 44 and then may be mixed together.

Figures 22, 23:

FIG. 22 is a bottom, partial-perspective view of the sealing tape 10 in the preferred embodiment. Here, it may be seen that the channel stops 40 may be built into the sealing tape 10 and/or retroactively inserted into the channel 30 of the sealing tape 10. In either case, the channel stops 40 may also be perforated to match the perforated portions 32 of the sealing to 10. This may make it easier to cut or tear the sealing tape 10 at the predetermined points 34.

FIG. 23 is a bottom, partial-perspective view of one end of the sealing tape 10 in the preferred embodiment. This figure may highlight an individual length of the tape 10 after it has been cut along the perforated portion 32. The bottom sides 16, 22 of the first and second sides 12, 18 may also comprise an adhesive backing 70. The adhesive backing 70 may be peeled off, pulled off, and/or otherwise removed to reveal the adhesive underside 36 of the tape 10.

Figure 24:
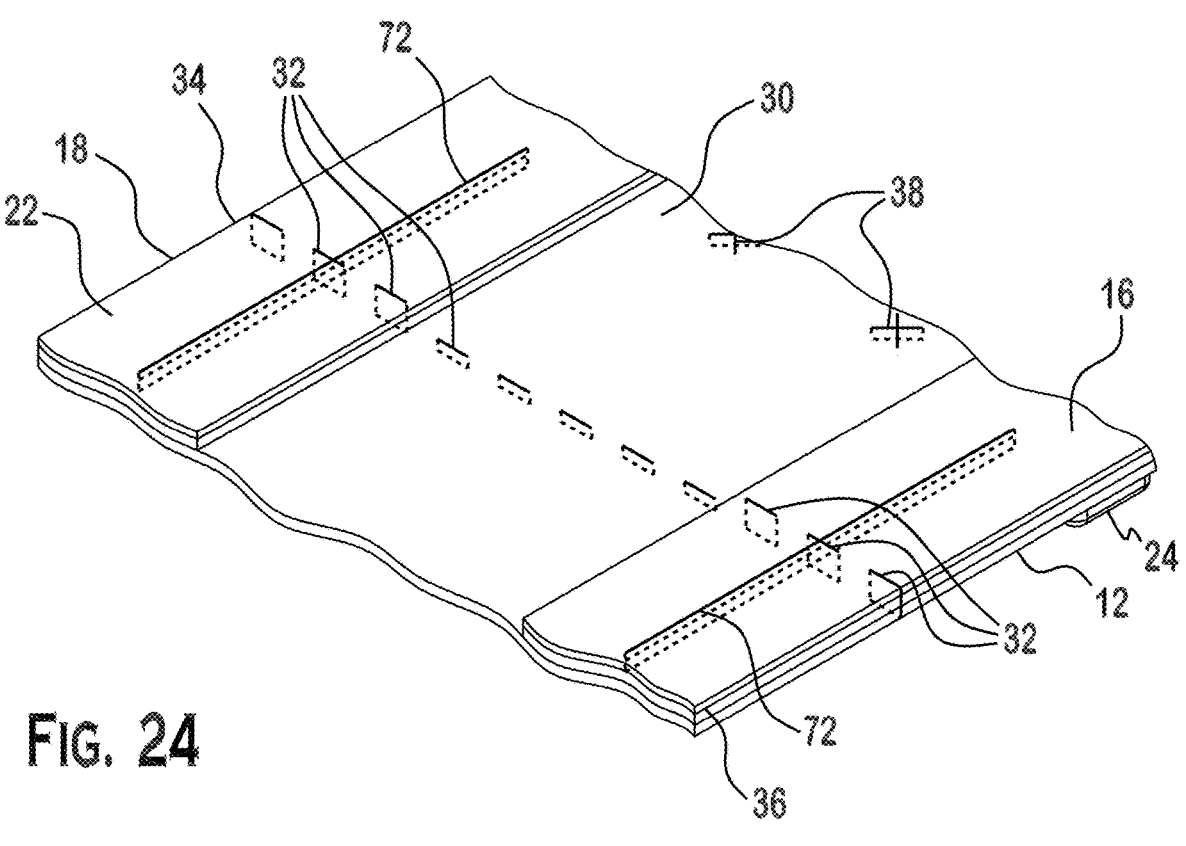

FIG. 24 is a bottom, partial-perspective view of the sealing tape 10 in an alternative preferred embodiment. This figure may illustrate how slits 72 may be formed in the first and second bottom sides 16, 22 of the first and second sides 12, 18 of the sealing tape 10. The slits 72 may be perpendicular to the perforated portion 32.

Figure 25:
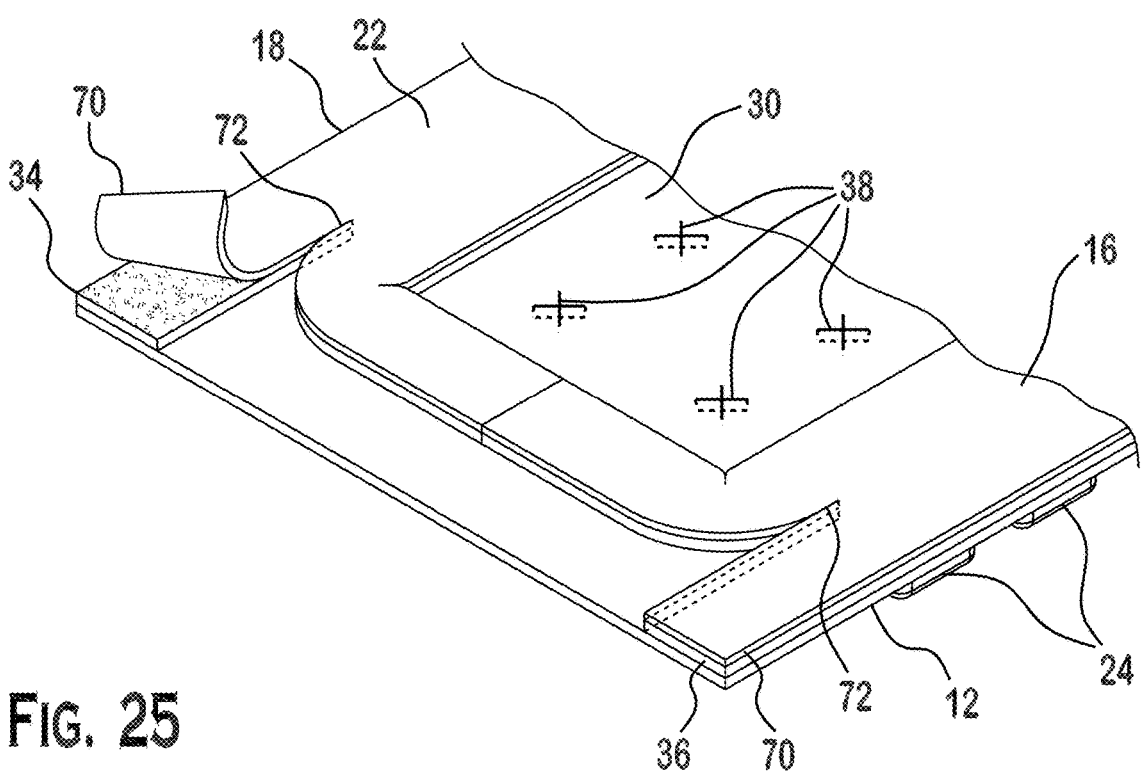

FIG. 25 is a bottom, partial-perspective view of the sealing tape 10 in an alternative preferred embodiment. Once the sealing tape 10 may be cut and/or torn at the Perforated portion 32, the inner portions of the first and second bottom sides 16, 22 delineated by the slits 72 may be folded inward to form channel stops 40. In this way, the sealing tape 10 itself may be manipulated to form the channel stops 40.

Figure 26:
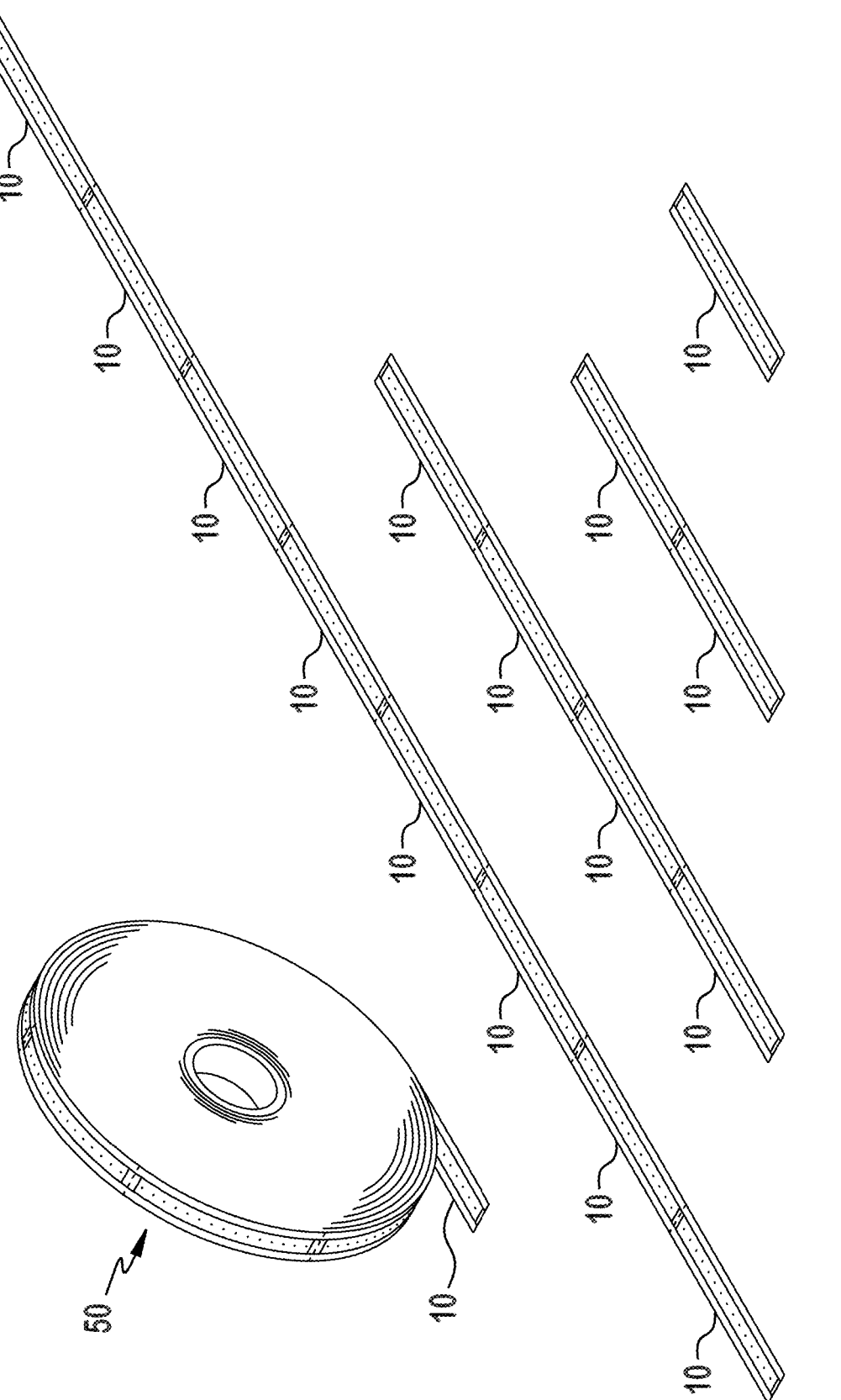

FIG. 26 is a front perspective view of a roll 50 of sealing tape 10 in the preferred embodiment. The roll 50 may be unrolled to reveal several lengths of the tape 10. The tape 10 may be cut into strips including a multitude of different lengths. A strip of the sealing tape 10 may be one, two, three, four, five, six, or more predetermined lengths together before being cut off at predetermined point 34 utilizing the perforated portion 32.

DETAILED DESCRIPTION OF THE
PREFERRED EMBODIMENT

Certain terminology is used in the following description for convenience only and is not limiting. The words "right," "left," "up," and "down" designate the directions as they would be understood by a person facing in the viewing direction unless specified otherwise. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "outer" and "inner" refer to directions away from and toward, respectively, the geometric center of the specified element, or, if no part is specified, the geometric center of the sealing tape 10. The terms "downward" and "upward" refers to directions above (or away from) and below (or toward) the intermediary portion 28 during operation, respectively, unless specified otherwise. The terms "forward" and "front" refer to a direction outwardly and away from one end of a length of the sealing tape 10, and the term "rear" and "back" refers to a direction outwardly and away from the opposite end of a length of the sealing tape 10. The terms "axial" and "radial" refer to directions along a central axis running parallel and through the intermediary portion 28, respectively. The terms "touching," "abutting," "against," and "contacting" when used in connection with two surfaces is defined as meaning "being positioned anywhere between actual touching of two surfaces to being in facing orientation and within 1 inch (or 2.54 centimeters) apart." Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The language "at least one of 'A', 'B', and 'C'," as used in the claims and in corresponding portions of the specification, means "any group having at least one 'A'; or any group having at least one 'B'; or any group having at least one 'C';—and does require that a group have at least one of each of 'A', 'B', and 'C'." More specifically, the language 'at least two/three of the following list' (the list itemizing items '1', '2', '3', '4', etc.), as used in the claims, means at least two/three total items selected from the list and does not mean two/three of each item in the list. The term "interior", as used in the claims and corresponding portions of the specification means the area proximate to the center of the invention. The term "exterior" similarly defines the area not in proximity to the center of the invention. Additionally, the words "a" and "one" are defined as including one or more of the referenced items unless specifically stated otherwise. The terminology includes the words specifically mentioned above, derivatives thereof, and words of similar import.

Referring generally to FIGS. 1-26, wherein like numerals indicate like elements throughout, the sealing tape 10 is disclosed in its preferred embodiments. The sealing tape 10 may herein also be referred to as an adhesive device 10, or simply as tape 10, without departing from the scope of the present invention. One of ordinary skill in the art would appreciate from this disclosure that the present invention may be used in any applications a standard tape would be desired, such as plugging a hole, attaching objects together, reinforcing an object, or the like, without departing from the scope of the present invention. The present invention may be entirely manually usable or may be deployed using any sort of assistance device, such as a tape gun, without departing from the scope of the present invention.

Referring to FIGS. 1 and 4, the sealing tape 10 may be seen in one preferred embodiment. The sealing tape 10 may comprise a first side 12 connected to a second side 18 by an intermediary portion 28. The first side 12 and the second side 18 may comprise a first top side 14 and a second top side 20, respectively. The first top side 14 and the second top side 20 may be configured for a first plurality of chambers 24 and a second plurality of chambers 26 to extend therealong, respectively. One of ordinary skill in the art will appreciate from this disclosure that the first plurality of chambers 24 and the second plurality of chambers 26 may be swapped, substituted, reversed, or the like, for one another without departing from the scope of the present invention. The first and second pluralities of chambers 24, 26 may also be configured to at least partially overlap the intermediary portion 28. While FIG. 1 may show one length of sealing tape 10, FIG. 4 may highlight two lengths of sealing tape 10 together.

Referring now to FIG. 2, the sealing tape 10 may be seen in a roll 50. It may be advantageous to store the sealing tape 10 in a roll for compactness and for easy deployment when actively using the sealing tape 10. The sealing tape 10 may also be comprised of multiple individual sections of predetermined lengths. These individual sections may be separated from one another at predetermined points 34 where perforated portions 32 may span a width of the sealing tape 10. As can be seen in greater detail in FIG. 26, it may be desirous for a user to employ one, two, three, four, or more section of sealing the sealing tape together at a time without departing from the scope of the present invention.

Referring now to FIG. 3, the underside of the sealing tape 10 may be seen in greater detail. The first and second sides 12, 18 may comprise first and second bottoms sides 16, 22, respectively. These bottom sides 16, 22 may further comprise may comprise adhesive undersides 36 which may allow the sealing tape to stick to a surface. A channel 30 may be defined under the intermediary portion 28 and between the first and second bottom sides 16, 22. This channel 30 may be stopped and/or dammed by employing channel stops 40 between the multiple individual lengths of the sealing tape 10. The channel stops 40 may be beneficial when placing the tap 10 along an inclined or vertical surface to substantially prevent adhesive in the channel from flowing out from under an end of the tap 10 prior to curing. The intermediary portion 28 may also comprise a plurality of check valves 38 located therein. The plurality of check valves 38 may be configured to open under pressure. The check valves are preferably formed by at least one cut in a material of the tape which resists deformation. That way when the mixed adhesive is pressed downwardly, the material of the check valve tends to deform to allow the adhesive therethrough and then return to a normal (generally non-deformed position) to prevent the adhesive from leaving the channel prior to curing. Although a preferred type of check valve is shown, those of ordinary skill in the art will appreciate from this disclosure that any sort of substantially one way flow channel can form the check valves or the check valves can be omitted altogether without departing from the scope of the present invention. For example, the check valves can be replaced with holes or a fine mesh that allows the adhesive to move into the channel when pressure is applied by a user, but which are small enough to generally reduce the amount of adhesive flowing out of the channel during curing. Similarly, while preferred placements and numbers of check valves are shown, those of ordinary skill in the art will appreciate from this disclosure that multiple check valves can be used in each chamber 24, 26 and that the placements within the chambers can vary from that illustrated in the drawings without departing from the scope of the present invention.

Referring still to FIG. 3, sealing tape may be cut with scissors 42 at the perforated portions 32 of the sealing tape 10. However, one of ordinary skill in the art will appreciate from this disclosure that the tape 10 may be cut, torn, separated, slashed, sliced, chopped, or the like, along the perforated portions 32, or at any other portion desired by a user, without departing from the scope of the present invention. The channels stops 40 may also be similarly cut to stop the channels 30 of adjacent individual lengths of the tape 10.

Referring now to FIG. 5, a close-up of one end of the sealing tape 10 may be seen in the preferred embodiment. Each of the first and second pluralities of chambers 24, 26 may comprise a plurality of sub chambers 44. Each of these chambers 24, 26 may be defined at least in part by the chamber top 48 and a chamber sidewall 49 wrapping them around. Each of the chambers 24, 26 may be bounded on the bottom by the first and second topsides 14, 20 of the first and second sides 12, 18—the first and second topsides 14, 20 being opposite the chamber tops 48. The sub chambers 44 contained within each of these chambers 24, 26 may be separated and/or divided from one another by some chamber dividers 26. At least one sub chamber 44 within each of the plurality of first and second chambers 24, 26 may cover one of the plurality of check valves 38 of the intermediary portion 28 of the sealing tape 10.

Referring now to FIG. 6, an alternative preferred embodiment of the sealing tape 10 may be seen. In this embodiment, a first plurality of chambers 24 may be positioned centrally along the intermediary portion 28 of the sealing tape 10. The second plurality of chambers 26 may be omitted. In this way, the first plurality of chambers 24 may not be positioned on the first side 12 of the sealing tape 10 at all. This may be advantageous as the plurality of chambers 24 can be positioned directly above the channel 30 below.

Referring now to FIGS. 7, 10, and 11, the inside of an exemplary one of the plurality of chambers 24, 26 may be seen in greater detail. Each of the plurality of sub chambers 44 may contain a chemical compound 52 therein. The chemical compound 52 may herein also be referred to as a bonding chemical 52, or simply as a bonding liquid 52, without departing from the scope of the present invention. The chemical compound 52 may comprise a first chemical compound A and a second chemical compound B. It is preferred, but not necessary, that the first chemical compound A and the second chemical compound B be located alternatingly within adjacent sub chambers 44. The chemical compound 52 may be any epoxy or bonding material, with the first chemical compound A and the second chemical compound B being liquid components thereof. The first chemical compound A in the second chemical compound B may be configured to remain liquids at room temperature and when not mixed together, but may also be configured to cure, harden, and form a bond when mixed together. One of the plurality of check valves 38 may separate one of the chambers 24, 26 from the channel 30 of the sealing tape 10.

It is preferable that the total volume of each of the plurality of sub chambers 44 may be filled with at least fifty percent (50%) of either the first or second chemical compound A, B. More preferably, the total volume of each of the plurality of sub chambers 44 may be filled with at least seventy percent (70%) of either the first or second chemical compound A, B. More preferably still, the total volume of each of the plurality of sub chambers 44 may be filled with at least ninety percent (90%) of either the first or second chemical compound A, B. Most preferably, the total volume of each of the plurality of sub chambers 44 may be entirely filled with either the first or second chemical compound A, B.

While it is preferred that each of the chambers 24, 26 contain both A and B components that are each located in separate sub chambers 44, those of ordinary skill in the art will appreciate that each chamber can be a single chamber having only one of the A or B components therein such that when the chambers 24, 26 are depressed, the epoxy is formed (by the A and B components mixing) in the channel without departing from the scope of the present invention.

Referring generally to FIGS. 8 and 9, the sealing tape 10 may be seen applied to first and second construction materials 58, 62. The construction materials 58, 62 may be plywood for roofing, drywall, pipes, or the like, without departing from the scope of the present invention. The adhesive undersides 36 may be used to detachably affix the sealing tape 10 to first and second surfaces 60, 64 of the first and second construction materials 58, 62, respectively. Generally speaking, when first and second construction materials 58, 62 may be joined together in this way by the sealing tape 10, a gap 66 may be formed between the first and second construction materials 58, 62. Specifically, FIG. 8 may highlight the tape 10 in the preferred embodiment with first and second pluralities of chambers 24, 26. FIG. 9 may show the tape 10 in the alternative preferred embodiment with only the first plurality of chambers 24. It is preferred, but not necessary, that channel 30 be above the gap 66.

Referring now to FIG. 12, the purpose and function of the improved sealing tape 10 may become clearer. Once the sealing tape 10 may be stuck to first and second surfaces 60, 64 of adjacent first and second construction materials 58, 62, a rudimentary seal closing the gap 66 may be formed. However, in order to fully seal the gap 66 and at least partially bond the first construction material 58 the second construction material 62, the bonding chemical 52 may be utilized. One of ordinary skill in the art will appreciate from this disclosure that a user of the tape 10 may roll out, crush, squeeze, squish, or the like, the pluralities of first and second chambers 24, 26 of the tape 10 using a roller 68, a squeegee, a hand, a foot, or the like, without departing from the scope of the present invention. As can be seen in FIG. 12, a roller 68 may be employed to crush each of the sub chambers 44 in series. FIG. 12 may highlight the first of these sub chambers 44 being crushed. When each of the sub chambers 44 may be crushed in series, the pressure buildup of the chemical compound 52 within the sub chamber dividers 46 delineating the sub chambers 44 may rupture, burst, pop, explode, rip, or the like, the sub chamber dividers 46. With the sub chamber dividers 46 rupturing under pressure, a first chemical compound A may be forced into and mixed with a second chemical compound B. This may be seen clearly in FIG. 12 as the sub chamber divider may be split and the first chemical compound A previously contained with one of the sub chambers 44 may now flow into and begin to mix with the second chemical compound B in the adjacent sub chamber 44.

One of ordinary skill in the art will appreciate from this disclosure that the material forming the sub chamber dividers 46 may be weaker than the material forming the chamber top 48 and the chamber sidewalls 49 such that the sub chamber dividers 46 may rupture under any pressure from a roller 68 and allow the chemical compound 52 to escape therethrough before the chamber top 48 in the chamber sidewalls 49 would rupture without departing from the scope of the present invention.

Referring now to FIG. 13, one chamber of the first and second pluralities of chambers 24, 26 may be continuing to be rolled further than shown in FIG. 12. At this stage, the first chemical compound A and the second chemical compound B may be completely mixed within the middle of the sub chambers 44. The first of the sub chambers 44 that previously contained first chemical compound A may be completely flattened at this point. The mixture of the first chemical compound A and the second chemical compound B may form the bonding liquid 52.

Referring now to FIG. 14, the pressure of the roller 68 may now compress the middle of the sub chambers 44 such that the mixture of the first chemical compound A and the second chemical compound B may be forced through the final sub chamber divider 46 and into the innermost sub chamber 44. This may cause the bonding chemical 52 to once again mix with the first chemical compound A contained in this innermost sub chamber 44.

Referring now to FIG. 15, all of the first and second chemical compounds A, B may have been mixed into a bonding chemical 52. This final mixture of the bonding chemical 52 may be partially contained within the innermost sub chamber 44. At this stage, the bonding chemical 52 may only escape through the check valve 38.

Referring now to FIG. 16, the roller 68 may have completely crushed one of the chambers of the first and second plurality of chambers 24, 26. This may have the effect of forcing the bonding liquid 52 through the check valve 38 located in the intermediary portion 28 of the sealing tape 10. The bonding chemical 52 may then flow through the check valve 38 into the channel 30 located there under. The bonding chemical 52 may then mix in the channel 30 with other bonding chemicals 52 which may have been released from other chambers of the first and second plurality of chambers 24, 26. A total mixture of the bonding chemicals 52 may then be spread through the channel 30 and may fill in the gap 66 between the first and second construction materials 58, 62. The total mixture of the bonding chemicals 52 may then cure, harden, and form a seal under the sealing tape. The bonding chemicals 52 may further help to bond the first and second construction materials 58, 62 together. This may have the advantage of not just covering the gap 66 as a regular tape would, but also filling in the gap 66 with Ecodur, an epoxy, a resin, or the like, that may strengthen the seal in the gap 66.

It may be important to note that the channel stops 40 may be employed to prevent the bonding chemicals 52 from leaking out of the channel 30 exposed ends of the tape 10. It is preferred, but not necessary, that channel stops 40 be omitted between adjacent lengths of the tape 10 connected in series.

Referring now to FIGS. 17 and 18, an alternative preferred embodiment of the present invention may be seen. In this alternative preferred embodiment, there may be five sub chambers 44 contained within each one of the first and second pluralities of chambers. These five sub chambers 44 may also be divided by sub chamber dividers 46 as may be the case in any embodiments containing any number of sub chambers 44. The sub chambers 44 may still contain first chemical compound A and second chemical compound B in series alternatingly.

Referring generally to FIGS. 19-21, another alternative preferred embodiment of the present invention may be seen. In this alternative preferred embodiment, the sub chambers

44 may exist and may be divided in parallel as well as in series within each chamber of the first and second pluralities of chambers 24, 26. In this way, and as can be seen more clearly in FIG. 21, the sub chambers 44 that may be connected in parallel can be rolled out at the same time such that a first chemical compound A and a second chemical compound B can be simultaneously deposited into a sub chamber 44 adjacent to both of the sub chambers 44 containing the first and second chemical compounds A, B. These figures also highlight how any sub chambers 44 may be empty without departing from the scope of the present invention.

Referring now to FIG. 22, The underside of the sealing tape 10 may be seen in more detail. The perforated portion 32 extending across the width of the sealing tape 10 may also go through a channel stop 40. The channel stop 40 may be built into the tape 10 with perforations or may be retroactively inserted into the channel 30 of the tape 10. This may allow the tape tend to be cut or torn along the perforated portion 32 and may keep the channel stop 40 intact on both sides of the cut.

Referring now to FIG. 23, the first and second bottom sides 16, 22 of the sealing tape 10 may comprise an outer layer of adhesive backing 70. The adhesive backing 70 may be peeled off or otherwise removed to expose the adhesive underside 36. This may have the advantage of keeping the adhesive underside 36 from drying out or otherwise being less adhesive. This may have the further advantage of keeping the tape 10 in the roll 50 from sticking to itself.

Referring now to FIG. 24, an alternative preferred embodiment of the present invention may be seen. In this alternative preferred embodiment, the first and second bottom sides 16, 22 may comprise slits 72 running therethrough. The slits 72 may be perpendicular to, and cross, the perforated portions 32.

Referring now to FIG. 25, the alternative preferred embodiment of the present invention including the slits 72 may be seen. FIG. 25 may illustrate how the slits 72 may contribute to an additional built-in feature. After the tape 10 may have been cut along a perforated portion 32, the slits 72 may be split. An innermost portion of the first and second bottom sides 16, 22 delineated by the slits 72 may be pulled, curled, or folded inward into the channel 30 to form channel stops 40. In this way, the first and second bottom sides 16, 22 can be used to form channel stops 40 instead of channel stops 40 of previously disclosed embodiments being already built-in or retroactively inserted.

Referring now to FIG. 26, a roll 50 of the sealing device 10 may be seen. One of ordinary skill in the art will appreciate from this disclosure that the sealing tape 10 may come in rolls 50 of all different sizes without departing from the scope of the present invention. It may be advantageous to use one, two, three, four, five, six, seven, eight, or more individual lengths of the tape 10 to seal a gap.

It is preferable that the distance between adjacent predetermined points 34 along the tape 10 be less than or equal to ten feet (10'). It is more preferable that the distance between adjacent predetermined points 34 along the tape 10 be less than or equal to six feet (6'). It is more preferable still that the distance between adjacent predetermined points 34 along the tape 10 be less than or equal to three feet (3'). It is most preferable that the distance between adjacent predetermined points 34 along the tape 10 be less than or equal to one foot (1').

It is preferable that the width of the tape 10 be less than or equal to twelve inches (12"). It is more preferable that the width of the tape 10 be less than or equal to nine inches (9").

It is more preferable still that the width of the tape 10 be less than or equal to six inches (6"). It is most preferable that the width of the tape 10 be less than or equal to four inches (4").

One of ordinary skill in the art will appreciate from this disclosure that the various components and elements of the present invention may be constructed of any suitably strong, wear-resistant, flexible (where desired), and inexpensive metals, polymers, alloys, plastics, fabrics, and other materials without departing from the scope of the present invention.

One of ordinary skill in the art will appreciate from this disclosure that device elements, as well as materials, shapes and dimensions of device elements, as well as methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed, described in the specification, and/or shown in the figures. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

What is claimed is:

1. A tape, comprising:
an adhesive underside configured to detachably affix to a first surface,
a central channel spanning a length of the tape, and
a plurality of chambers located along the length of the tape, the plurality of chambers being configured to contain a bonding chemical, wherein
when the plurality of chambers are squeezed, the bonding chemical is released into the central channel to cure and form an airtight seal.

2. The tape of claim 1, wherein the adhesive underside of the tape is configured to detachably affix to a second surface spaced from the first surface, the central channel of the tape spanning a gap between the first and second surfaces.

3. The tape of claim 1, wherein each of the plurality of chambers comprise alternating sub chambers.

4. The tape of claim 3, wherein the bonding chemical comprises a first chemical compound and a second chemical compound, the first and second chemical compounds being stored in the alternating sub chambers, wherein
when each of the plurality of chambers is squeezed, the first chemical compound contained in one of the alternating sub chambers is forced into and mixed with the second chemical compound contained in another of the alternating sub chambers.

5. A sealing tape, comprising:
a first side having a first top side and a first bottom side,
a second side having a second top side and a second bottom side, the second side running parallel to the first side, and
an intermediary portion connecting the first side to the second side, the intermediary portion having a channel running therethrough, wherein the first and second bottom sides comprise an adhesive such that the first and second bottom sides can be detachably affixed to a surface, wherein
a first plurality of chambers extend lengthwise along the sealing tape, each of the first plurality of chambers being configured to hold a bonding liquid, and wherein
when the first plurality of chambers are squeezed, the bonding liquid is released into the channel of the intermediary portion to cure and form an airtight seal between the first and second sides.

6. The sealing tape of claim 5, further comprising a second plurality of chambers parallel to the first plurality of chambers, each of the second plurality of chambers being configured to hold the bonding liquid, wherein
when the second plurality of chambers are squeezed, the bonding liquid is released into the channel of the intermediary portion to mix with the bonding liquid of the first plurality of chambers to cure and form the airtight seal between the first and second sides.

7. The sealing tape of claim 5, further comprising a plurality of check valves located on the intermediary portion, each of the plurality of check valves corresponding to the first plurality of chambers, wherein
the plurality of check valves are configured to open under pressure when the first plurality of chambers are squeezed, the plurality of check valves allowing the bonding liquid to travel therethrough from the first plurality of chambers into the channel.

8. The sealing tape of claim 5, wherein each of the first plurality of chambers comprise alternating sub chambers.

9. The sealing tape of claim 8, wherein the bonding liquid comprises a first chemical compound and a second chemical compound, the first and second chemical compounds being stored in the alternating sub chambers, wherein
when each of the first plurality of chambers is squeezed, the first chemical compound contained in one of the alternating sub chambers is forced into and mixed with the second chemical compound contained in another of the alternating sub chambers.

10. The sealing tape of claim 8, wherein the alternating sub chambers are connected in series such that when the first plurality of chambers are squeezed, the bonding liquid is forced through all of the alternating sub chambers before being deposited into the channel of the intermediary portion.

11. The sealing tape of claim 5, wherein the first plurality of chambers is positioned along the intermediary portion of the sealing tape.

12. An adhesive device, comprising:
a first side having a first top side and a first bottom side,
a second side having a second top side and a second bottom side, the second side running parallel to the first side, and
an intermediary portion connecting the first side to the second side, the intermediary portion having a channel running therethrough, wherein
the first and second bottom sides comprise an adhesive such that the first and second bottom sides can be detachably affixed to a surface, wherein
the first and second top sides each comprise a plurality of chambers extending therealong, each of the plurality of chambers being configured to hold a bonding agent, and wherein
when the plurality of chambers are squeezed, the bonding agent is released into the channel of the intermediary portion to cure and form an airtight seal between the first and second sides.

13. The adhesive device of claim 12, further comprising a plurality of check valves located on the intermediary portion, each of the plurality of check valves corresponding to one of the plurality of chambers, wherein the plurality of check valves are configured to open under pressure when the plurality of chambers are squeezed, the plurality of check valves allowing the bonding agent to travel therethrough from the plurality of chambers into the channel.

14. The adhesive device of claim 13, wherein the plurality of check valves form a first row and a second row extending the length of the adhesive device, the first row of check valves corresponding to the plurality of chambers located on the first side and the second row of check valves corresponding to the plurality of chambers located on the second side.

15. The adhesive device of claim 12, wherein the bonding agent is a material selected from the group consisting of epoxy, resin, and glue.

16. The adhesive device of claim 12, wherein each of the plurality of chambers comprise alternating sub chambers.

17. The adhesive device of claim 16, wherein the bonding agent comprises a first chemical compound and a second chemical compound, the first and second chemical compounds being stored in the alternating sub chambers, wherein when each of the plurality of chambers is squeezed, the first chemical compound contained in one of the alternating sub chambers is forced into and mixed with the second chemical compound contained in another of the alternating sub chambers.

18. The adhesive device of claim 17, wherein the first and second chemical compounds are configured to remain liquids when stored separately in the plurality of sub chambers, and wherein when the first and second chemical compounds are mixed, a resulting chemical compound formed from the first and second chemical compounds being mixed is configured to harden.

19. The adhesive device of claim 16, wherein the alternating sub chambers are connected in series such that when the plurality of chambers are squeezed, the bonding agent is forced through all of the alternating sub chambers before being deposited into the channel of the intermediary portion.

20. The adhesive device of claim 12, wherein the adhesive device has perforated portions at predetermined points, the adhesive device being configured to be shortened by cutting the adhesive device at the perforated portions.

* * * * *